Dec. 18, 1928.
J. HACKWORTH ET AL
1,695,960
DEVICE FOR HANDLING RAILROAD TIES
Filed Aug. 6, 1927
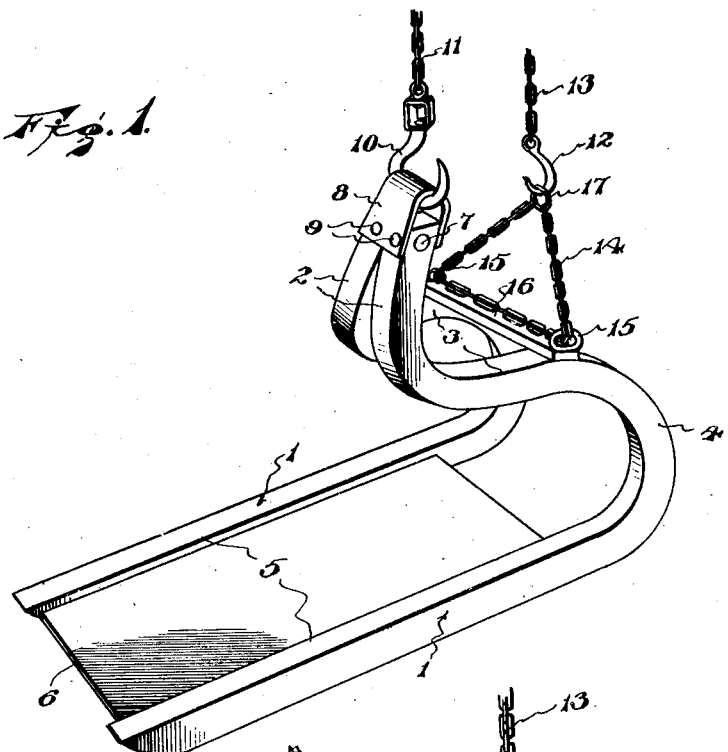
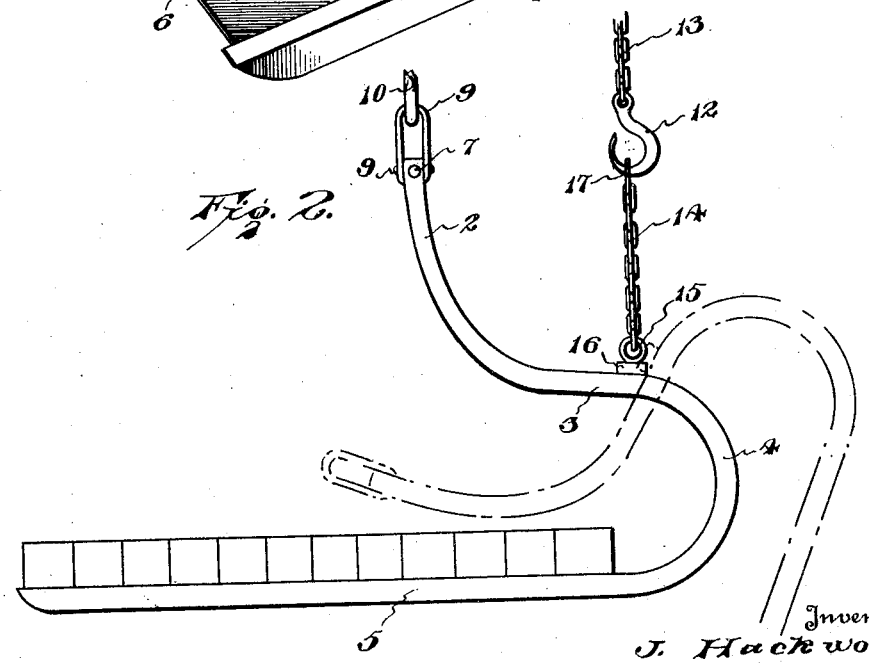
Inventor
J. Hackworth
W. Kuehne
By Lacey & Lacey, Attorneys Patented Dec. 18, 1928.

1,695,960

UNITED STATES PATENT OFFICE.

JESSE HACKWORTH AND WILLIAM KUEHNE, OF IRONTON, OHIO; SAID HACKWORTH ASSIGNOR TO SAID KUEHNE.

DEVICE FOR HANDLING RAILROAD TIES.

Application filed August 6, 1927. Serial No. 211,223.

This invention relates to article handling apparatus and more particularly to a hook by means of which railroad ties may be lifted and a number of ties easily transported from one place to another.

One object of the invention is to so form the hook that it may be suspended from strong chains or cables of a traveling crane or the like and its tines or arms retained in a horizontal position in order to support ties or the hook allowed to tilt in order to permit the ties to slide off its arms into a treating vat or car or onto a pile of ties where they are to be stacked.

Another object of the invention is to form the fork of strong bars bent to the desired shape and securely joined and braced.

Another object of the invention is to provide a platform between the horizontal tine forming portions of the bars so that a workman may stand upon the fork if so desired or the fork employed to lift small articles which are too heavy to be handled by a workman.

The invention is illustrated in the accompanying drawing, wherein

Figure 1 is a perspective view of the improved tie handling fork, and

Fig. 2 is a view showing the fork in side elevation with ties supported thereon, the tilted position of the fork being indicated by dotted lines.

The improved tie handling fork consists principally of bars 1 which are preferably rectangular in cross section and formed of any suitable strong metal. These bars which constitute tines for the fork are bent in spaced relation to their ends to provide upstanding shank forming ends 2 from which project intermediate portions 3. The intermediate portions extend rearwardly from the upstanding end portions and merge into depending curved portions 4 leading to the horizontally disposed tines or arms 5. The portions of the bars from which the tines 5 are formed are of greater length than the intermediate portions 3 and, therefore, the tines will project forwardly beyond the upstanding ends 2 and a great many ties may be placed transversely upon the tines. It should be further noted that the weight to the rear of the upstanding end portions 2 will to a great extent counterbalance the weight of the forward ends of the tines and ties supported thereby and, therefore, the load will be well distributed and the fork may be easily moved from one place to another by its crane without the ties being liable to accidentally slip off the fork. A platform 6 which preferably consists of a sheet of strong metal extends between the tines or arms 5 and may have its side portions removably seated in grooves formed in the side faces of the arms or rigidly secured to the tines in any desired manner. By providing the platform 6 a workman may stand upon the fork or small objects of great weight may be placed upon the platform and transported from one place to another. The upper end portions 2 of the bars converge upwardly and have their upper ends secured in contacting relation to each other preferably by a strong bolt or rivet 7 passed transversely through the bars. A yoke 8 of an inverted U-shape straddles the upper ends of the bars, as clearly shown in the drawing, and has its depending arms secured against the front and rear faces of the bars by bolts or rivets 9. Therefore, the upper ends of the two bars will be very securely held together and there will be no danger of them coming apart when the hook in in use. Since the yoke 8 extends above the upper ends of the bars, it may be engaged with a hook 10 carried by a chain 11 leading from a suitable drum forming part of a crane. The fork is also to be engaged with a hook 12 carried by a second chain 13 leading from the crane and in order to do so there has been provided a chain or sling 14 which is threaded through eyes 15 at the ends of a cross bar 16 extending between and rigidly secured upon the intermediate portions 3 of the main bars of the hook. The portions of the chain extending from the ends of the cross bar 16 converge upwardly and are joined by a ring 17 of sufficient size to be easily engaged with the hook 12.

It will be readily seen from an inspection of the drawing and particularly Fig. 2 that by properly winding the chains upon their drums the fork may be drawn upwardly and moved to a place where ties are to be delivered. After the place of delivery has been reached, it is merely necessary to unwind the chain 11 with the chain 13 remaining stationary and the fork will be tilted, as indicated by dotted lines, in order to allow the ties to slip off the free ends of its tines. It will, of course, be obvious that, if desired, the fork may be tilted by winding the chain 13 upon its drum instead of unwinding the chain 11 but the first described method of tilting the fork has been found preferable. It will also be seen that if the ties are to be deposited upon a stack being built the chains 11 and 13 may be both unwound at an even rate of speed until the ends of the ties which project from the arms or tines of the fork rest upon other ties already in place upon a stack and the fork then moved transversely of the ties until out of engagement with them. Therefore, a large number of ties may be very easily lifted and after being conveyed to a place of delivery either dumped into a vat or carefully lowered onto a stack of ties.

Having thus described the invention, we claim:

An article handling device comprising a hook consisting of bars joined at their upper ends and consisting of bars joined at their upper ends and bent rearwardly and then downwardly in spaced relation and forwardly to provide a vertical shank and horizontal tines projecting forwardly beyond the shank and adapted to extend beneath articles to be lifted, means for connecting the upper end of said hook with a suspending member, a cross bar extending between and secured to the rearwardly extending portions of said bars, adjacent the downwardly bent portion thereof, eyes being provided at the ends of the cross bar, and a flexible member threaded through the eyes of said cross bar and extending upwardly therefrom and adapted to be engaged with a suspending member.

In testimony whereof we affix our signatures.

JESSE HACKWORTH. [L. S.]
WILLIAM KUEHNE. [L. S.]